(12) United States Patent
Lugo-Castillo et al.

(10) Patent No.: US 12,358,379 B2
(45) Date of Patent: Jul. 15, 2025

(54) VEHICLE MASS AND ROAD GRADE BASED REGENERATIVE BRAKING AND ANTI-ROLLBACK

(71) Applicant: Cummins Inc., Columbus, IN (US)

(72) Inventors: Jaime Antonio Lugo-Castillo, Unionville, IN (US); Jack Schneider, Columbus, IN (US); Sashwat Mahapatra, Columbus, IN (US)

(73) Assignee: Cummins Inc., Columbus, IN (US)

( * ) Notice: Subject to any disclaimer, the term of this patent is extended or adjusted under 35 U.S.C. 154(b) by 59 days.

(21) Appl. No.: 18/282,480

(22) PCT Filed: Mar. 19, 2021

(86) PCT No.: PCT/US2021/023177
§ 371 (c)(1),
(2) Date: Sep. 15, 2023

(87) PCT Pub. No.: WO2022/197310
PCT Pub. Date: Sep. 22, 2022

(65) Prior Publication Data
US 2024/0042870 A1    Feb. 8, 2024

(51) Int. Cl.
*B60L 15/20* (2006.01)
*G01G 19/03* (2006.01)

(52) U.S. Cl.
CPC .......... *B60L 15/2018* (2013.01); *G01G 19/03* (2013.01); *B60L 2240/12* (2013.01); *B60L 2240/16* (2013.01); *B60L 2240/642* (2013.01)

(58) Field of Classification Search
CPC ............. B60L 15/2018; B60L 2240/12; B60L 2240/16; B60L 2240/642; B60L 2240/26; B60L 2240/423; G01G 19/03
See application file for complete search history.

(56) References Cited

U.S. PATENT DOCUMENTS

| | | | |
|---|---|---|---|
| 7,516,007 | B2 | 4/2009 | Tamai et al. |
| 7,743,860 | B2 | 6/2010 | Soliman et al. |
| 7,828,694 | B2 | 11/2010 | Silveri et al. |
| 7,993,243 | B2 | 8/2011 | Silveri et al. |
| 8,145,374 | B2 | 3/2012 | Farnsworth |

(Continued)

FOREIGN PATENT DOCUMENTS

| | | | |
|---|---|---|---|
| CN | 111361544 A | 7/2020 | |
| WO | WO-2019005654 A1 * | 1/2019 | ............. B60K 17/04 |

OTHER PUBLICATIONS

Machine Translation of WO 2019005654 A1 PDF File Name: "WO2019005654A1_Machine_Translation.pdf" (Year: 2019).*

(Continued)

*Primary Examiner* — Lindsay M Low
*Assistant Examiner* — Ruben Picon-Feliciano
(74) *Attorney, Agent, or Firm* — Faegre Drinker Biddle & Reath LLP

(57) ABSTRACT

A method of controlling torque of an electric vehicle, including sensing a surface grade; determining an acceleration of the vehicle; determining an initial torque of the vehicle; estimating a weight of the vehicle based the surface grade, the acceleration, and the initial torque; converting the weight of the vehicle to a weight factor; and determining an output torque by applying the weight factor to the initial torque.

14 Claims, 7 Drawing Sheets

(56) References Cited

U.S. PATENT DOCUMENTS

| | | |
|---|---|---|
| 8,396,618 B2 | 3/2013 | Cikanek |
| 8,543,303 B2 | 9/2013 | Marcus |
| 9,026,289 B2 | 5/2015 | Zeng |
| 2011/0066322 A1 | 3/2011 | Karlsson |
| 2011/0106388 A1 | 5/2011 | Boeckenhoff |
| 2013/0297120 A1* | 11/2013 | Reed .................... B60W 10/115 903/902 |
| 2014/0067154 A1* | 3/2014 | Yu .......................... G06F 17/00 701/1 |
| 2014/0148993 A1 | 5/2014 | Brathe |
| 2014/0277867 A1 | 9/2014 | Nedorezov et al. |
| 2016/0090006 A1* | 3/2016 | Yamazaki ............. B60W 10/08 701/22 |
| 2017/0043777 A1 | 2/2017 | Books et al. |
| 2018/0257473 A1* | 9/2018 | Follen .................. B60W 20/12 |
| 2020/0384823 A1 | 12/2020 | Shukla et al. |

OTHER PUBLICATIONS

International Search Report and Written Opinion for International patent application No. PCT/US2021/023177, filed Mar. 19, 2021, mailed Jun. 8, 2021.
International Preliminary Report on Patentability received for PCT Patent Application No. PCT/US2021/023177, mailed on Sep. 28, 2023, 11 pages.

\* cited by examiner

VEHICLE MASS AND ROAD GRADE BASED REGENERATIVE BRAKING AND ANTI-ROLLBACK

CROSS-REFERENCE TO RELATED APPLICATIONS

The present application claims the benefit of priority to and is a U.S. national stage of International Patent Application No. PCT/US2021/023177 filed Mar. 19, 2021, which is incorporated herein by reference in its entirety.

FIELD OF THE DISCLOSURE

The present disclosure generally relates to a system for optimizing torque applied by a motor vehicle. More specifically, the disclosure relates to a system for optimizing regenerative braking and reducing rollback in a vehicle.

BACKGROUND OF THE DISCLOSURE

Electric vehicles, including electric vehicles without combustion engines and hybrid vehicles that include a combustion engine, are quickly becoming more commonplace on the roads today. A benefit of using an electric vehicle is the increase in efficiency and operational range achieved through the utilization of regenerative braking. During regenerative breaking, a negative torque is applied to the axle during coasting or deceleration events to recover energy. However, applying too much or too little regenerative torque could cause a skid event during braking or a decrease in vehicle efficiency. It becomes especially difficult to identify the amount of torque required when the mass of the vehicle is variable, as in the case of trucks, buses, and vehicles carrying cargo.

Conventional vehicles equipped with combustion engines and fully automatic transmissions mitigate rollback when launching from a standstill while on an uphill grade via a torque converter that produces a continuous driveline torque. While inefficient, the continuous driveline torque tends to counter the effects of gravity when launching on a grade.

Another issue especially prevalent in electric vehicle without torque converters, is vehicle rollback. When accelerating or decelerating on a grade, these vehicles risk rolling backwards or forwards. This problem is made more challenging with a fully loaded vehicle. Current systems to reduce rollback apply an open-loop torque proportional to movement when motion in an unwanted direction is sensed without consideration for differences in vehicles. It is desirable to equip electric drive vehicles with features that improve driveability.

SUMMARY

An electric vehicle, a driveline controller, and a method of reducing rollback and improving regenerative braking of the electric vehicle are provided herein. The method may be implemented by the driveline controller installed in the electric vehicle. Generally, the method comprises considering the vehicle mass and road grade in the determination of anti-rollback and regenerative braking torque, and then applying such torque.

In some embodiments, a method of controlling torque of an electric vehicle includes sensing a surface grade; determining an acceleration of the vehicle; determining an initial torque of the vehicle; estimating a weight of the vehicle based the surface grade, the acceleration, and the initial torque; converting the weight of the vehicle to a weight factor; and determining an output torque by applying the weight factor to the initial torque.

In some embodiments, a driveline controller comprises weight estimation logic structured to implement a method that includes sensing a surface grade; determining an acceleration of the vehicle; determining an initial torque of the vehicle; estimating a weight of the vehicle based the surface grade, the acceleration, and the initial torque; converting the weight of the vehicle to a weight factor; and determining an output torque by applying the weight factor to the initial torque.

In some embodiments, an electric vehicle comprises a driveline controller including weight estimation logic structured to implement a method that includes sensing a surface grade; determining an acceleration of the vehicle; determining an initial torque of the vehicle; estimating a weight of the vehicle based the surface grade, the acceleration, and the initial torque; converting the weight of the vehicle to a weight factor; and determining an output torque by applying the weight factor to the initial torque.

BRIEF DESCRIPTION OF THE DRAWINGS

The above-mentioned and other disclosed features, the manner of attaining them, and the advantages thereof will become more apparent and will be better understood by reference to the following description of disclosed embodiments taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Figure 1:
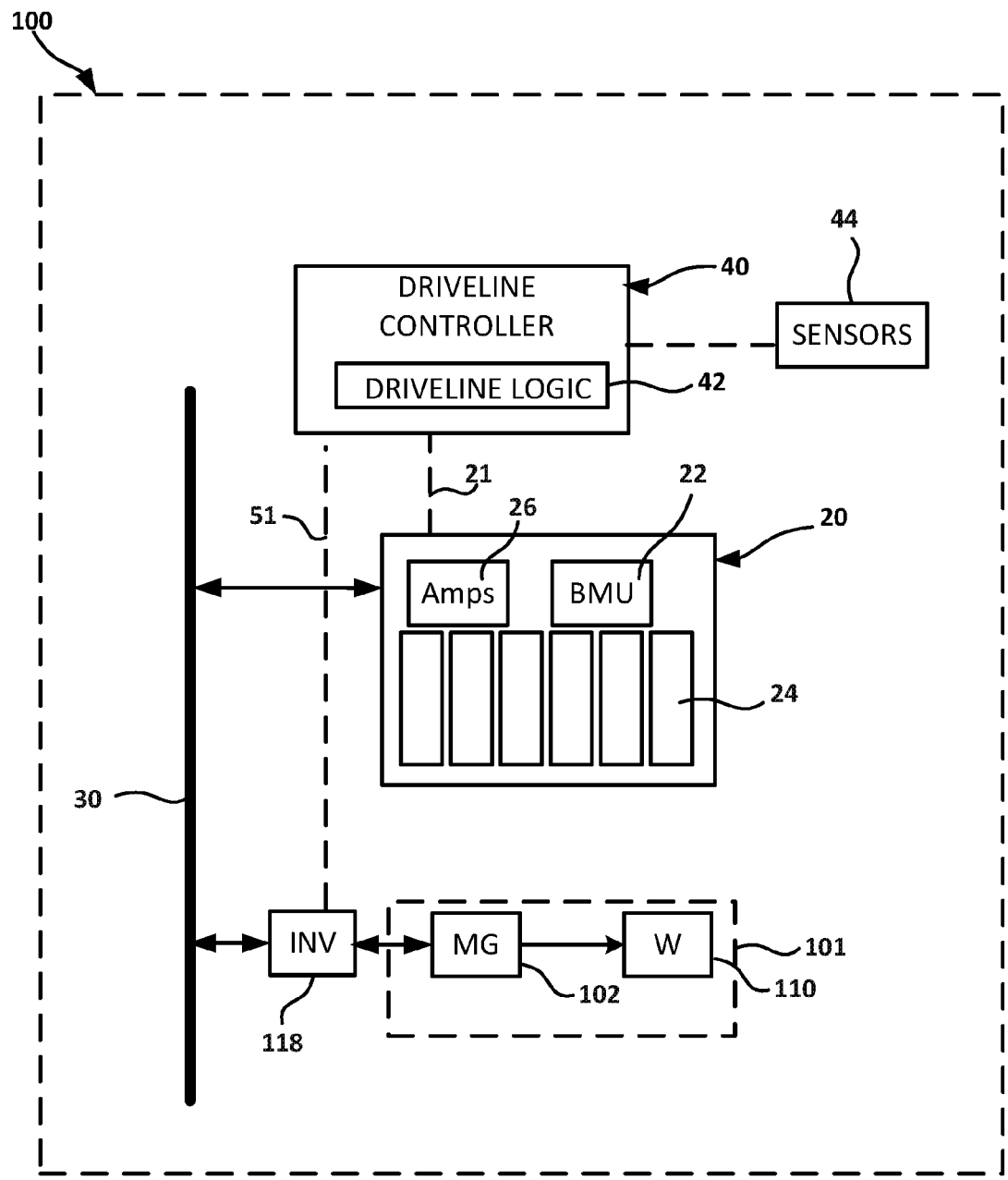
FIG. 1 is a schematic diagram of an electric vehicle.

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. No limitation of the scope of the invention is intended by the selection of the disclosed embodiments.

As used herein, an electric vehicle comprises a vehicle with an electric motor-generator, or motor. Generally, an electric powertrain or driveline comprises electric motors connected, directly or indirectly, to a traction system. A traction system may comprise wheels, for example. The wheels may drive continuous treads, or tracks, for example. The powertrain may be entirely electric, e.g., an all-electric vehicle, or may include, in addition to the electric motors, a combustion engine, e.g., a hybrid electric vehicle. Thus, hybrid and all-electric vehicles are types of electric vehicles.

Example electric vehicles include automobiles, trucks, forklifts, buses, straddle carriers, reach stackers, empty container handlers, etc. As used herein, the weight of a vehicle comprises the unloaded, or tare, weight as well as the loaded weight. The loaded weight of an electric vehicle can change significantly in use. The weight of a bus changes as passengers embark and disembark. A truck may be configured to removably attach a trailer or a container, thus its loaded weight includes the weight of the trailer or container, which may be empty, partially loaded, or fully loaded. A shipyard truck may weigh 25,000 lbs. unloaded and 75,000 lbs. loaded, for example, therefore the driveline torque and braking requirements vary significantly between loaded and unloaded states of electric vehicles.

FIG. 1 is a schematic diagram of an electric vehicle 100 comprising an electric traction system 101 including a motor-generator 102 and wheels 110 which may be connected to motor-generator 102 by an axle (not shown) or directly; an inverter 118 operable to generate a motor voltage for motor 102; a battery 20 connected to a bus 30 to power electric traction system 101; and a driveline controller 40. Driveline logic 42 of driveline controller 40, alternatively referred to as processing instructions, establishes communications, as is known in the art, between the driveline controller, the battery, and the inverter, over communication lines 21 and 51. Preferably the communication lines convey digital data between the components. A CAN bus may be implemented to provide the communication lines. The driveline controller monitors sensor signals from sensors 44, performs safety and performance checks, determines faults based thereon, and monitors operator controls, such as a mode selector (e.g., drive/reverse), a brake pedal position, and an accelerator pedal position. Electric vehicle 100 might not include a torque converter.

Battery 20 may comprise one or more battery packs comprising a battery management unit (BMU) 22 and battery modules 24. BMUs are generally well known. Temperature, voltage, and other sensors may be provided to enable BMU 22 to manage the charging and discharging of battery modules 24 without exceeding their limits, to detect and manage faults, and to perform other known functions. Via the communication line, BMU 22 may convey to driveline controller 40 information about the battery, including the battery charge power limit, temperature, faults, etc. Battery 20 may include a current sensor 26 to provide a measured current value to the BMU.

Driveline logic 42 is operable to determine a command for the inverter to supply a motor voltage to motor 102. The motor voltage is configured, as is known in the art, to result in a desired amount of torque generation by motor 102. The desired torque is configured taking into account gear ratios and multiple motors that may be engaged, including varying motor sizes. In some embodiments, driveline controller 40 and/or driveline logic 42 may include a vehicle dynamics model, which contains values associated with vehicle torque, direction, aerodynamics, inertia, rolling resistance, and frictional losses. Driveline controller 40 may include functionality well known in the art of electric vehicles. Such functionality may include functionality for range-extension, regeneration, and torque ratio control if a combustion engine is provided in a hybrid electric vehicle, etc.

It is desirable to equip electric drive vehicles with features that provide customers with driveability transparency vis-a-vis conventional vehicles, including features to counteract rollback motion. Different approaches have been considered based on detected motion, which can be susceptible to various limitations. For example, the response time may be such that the electric drive does not produce sufficient torque in time to prevent noticeable rollback motion. Additionally, the naturally underdamped kinematics of a vehicle driveline may be vulnerable to large, sudden torque applications that can result in driveline speed/torque oscillations. Algorithms based solely on speed to produce counteracting torque tend to produce oscillations based on sudden high-gain reaction. Algorithms based solely on position may tend to overshoot the desired maximum position as they must produce torque to both offset gravity plus the kinetic energy of a vehicle already in motion. Thus, even when the algorithms mitigate driveline speed oscillation, if such oscillation does occur the controller will often "chase" the changing speed with counteracting torque, thereby sustaining the oscillation. The tendency to excite driveline instability also complicates detection of rollback. If negative speed is indicative of rollback, negative speed can also be observed in a sudden stop where measured speed may exhibit underdamped settling at zero, producing several excursions into the negative speed range. The challenge becomes to distinguish negative speed due to rollback from negative speed due to undershoot.

Figure 2:
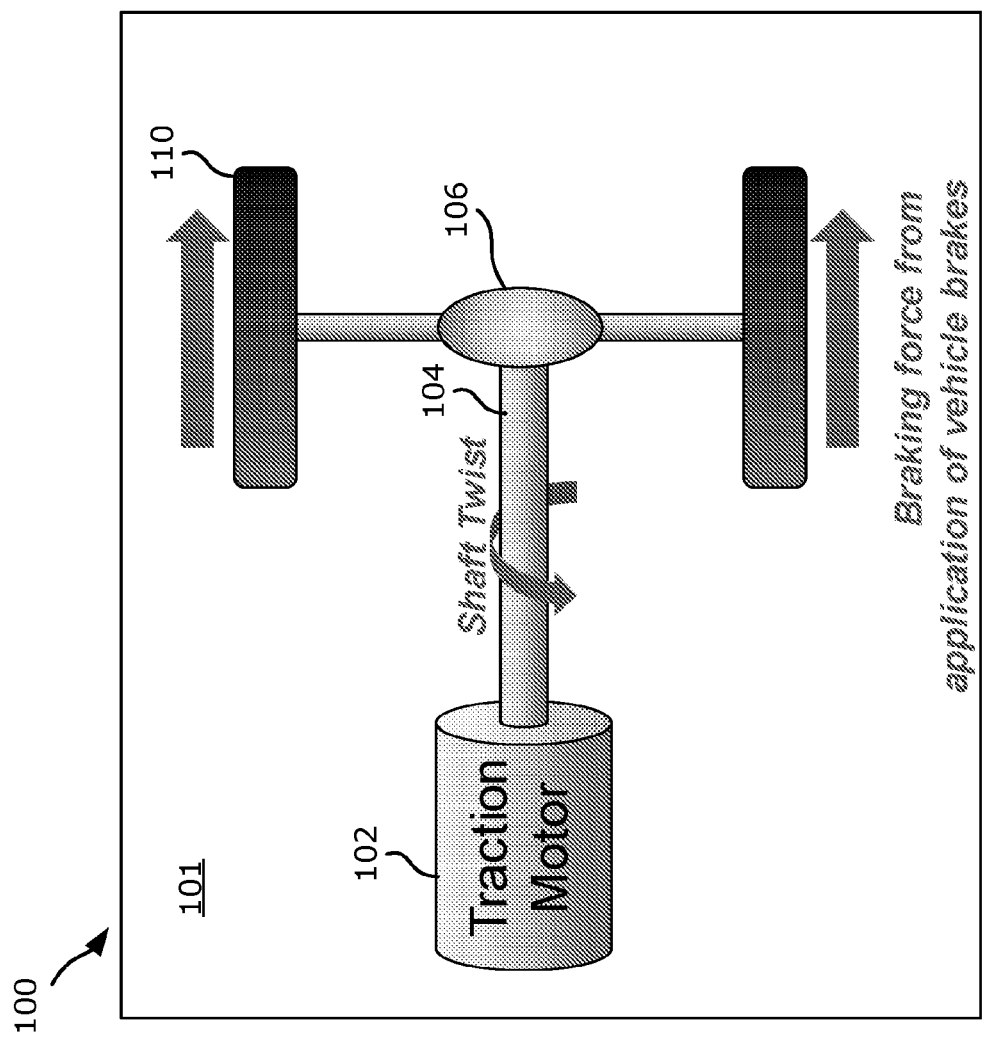
FIG. 2 is a schematic diagram of a driveline of the electric vehicle of FIG. 1, including a traction motor coupled to a driveshaft.

The kinematics of vehicle driveline 101 will now be described with reference to FIG. 2. Driveline 101 comprises traction motor, or motor-generator, 102 connected with a driveshaft 104 to turn a differential 106 connected to drive wheels 110. Torque applied by traction motor 102 twists driveshaft 104. On stopping, driveline oscillation occurs when the potential energy due to twist in the driveshaft is quickly released. If there is little or no energy in the shaft twist, there is no discernable oscillation. The way to differentiate between actual roll-back or undershoot due to oscillation is to recognize the factors that produce twist in the shaft, namely, applying vehicle brakes on a vehicle in motion. If the vehicle has been stopped or brakes have been released for a period of time, any negative speed observed is almost certainly rollback. Rollback control methods described below rely on these characteristics.

Figure 3:
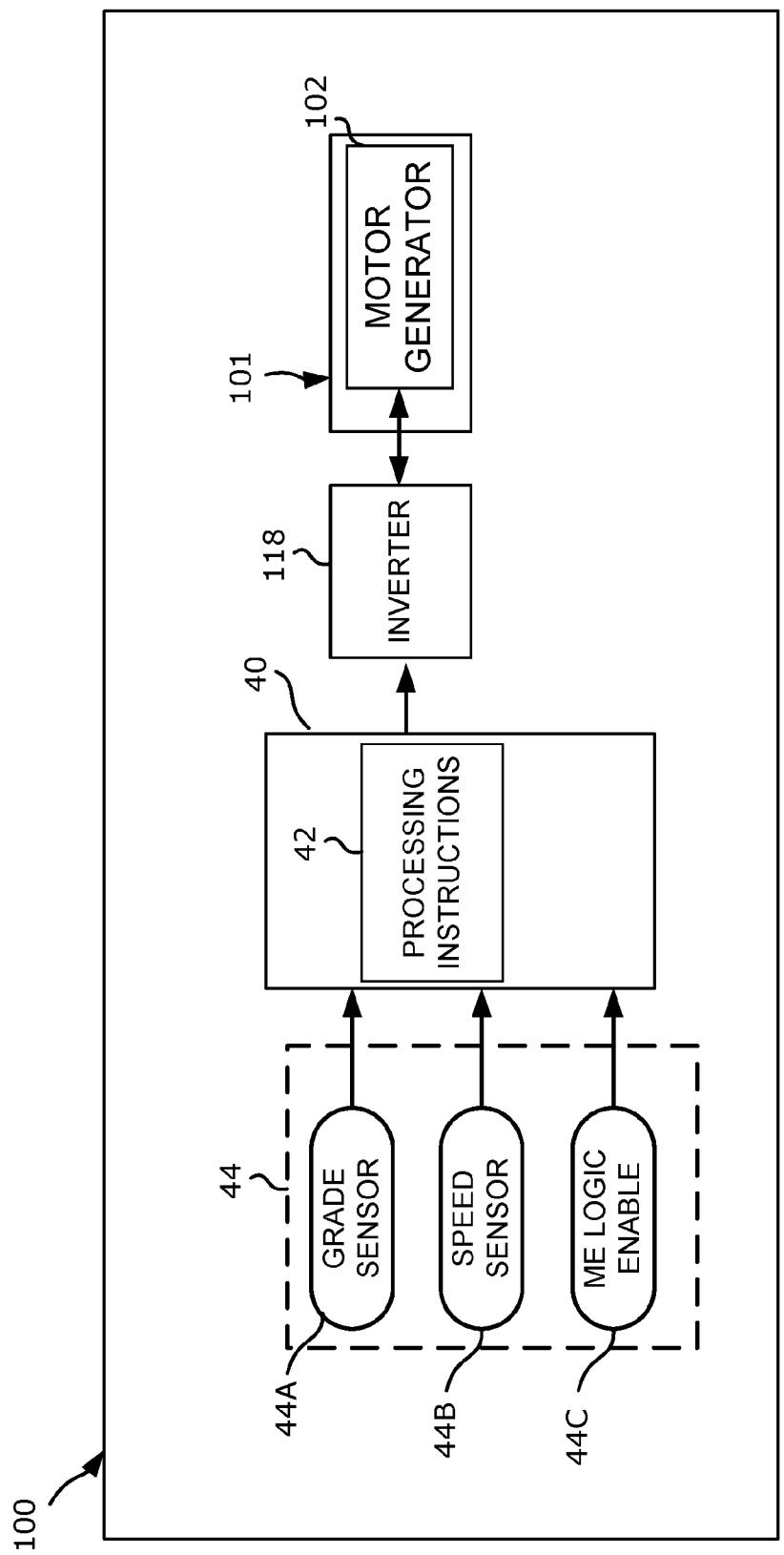
FIG. 3 is block diagram representation of an embodiment of a driveline controller in the electric vehicle of FIG. 1, operable to implement the rollback control method of FIGS. 4-7.

FIG. 3 depicts a block diagram of vehicle 100 with driveline 101 and motor-generator 102. As previously mentioned, driveline controller 40 has driveline logic, or processing instructions, 42 operable to process inputs from the various speed, transmission mode, grade, motor movement and angle, and brake sensors 44 in accord with the embodiments of the methods described above for controlling rollback, including grade sensor 44A and speed sensor 44B. The processing instructions can be embedded in driveline controller 42 or can be embedded in memory accessible by driveline controller 42. Also shown is inverter 118. Torque commands generated by processing instructions 42 are used by inverter 42 to generate motor voltage to cause motor generator 102 to produce the commanded torque. Motor generator 102 and inverter 118 can also convert the vehicle's kinetic energy to electrical energy during braking (deceleration or rollback mitigation). The converted electrical energy is stored in energy storage devices such as batteries 20, ultracapacitors and ultrahigh-speed flywheels to extend the driving range of the vehicle. Thus, it is desirable to apply regenerative braking whenever possible. The vehicle may also comprise a hydraulic or pneumatic braking system that works in conjunction with regenerative braking.

Figure 4:
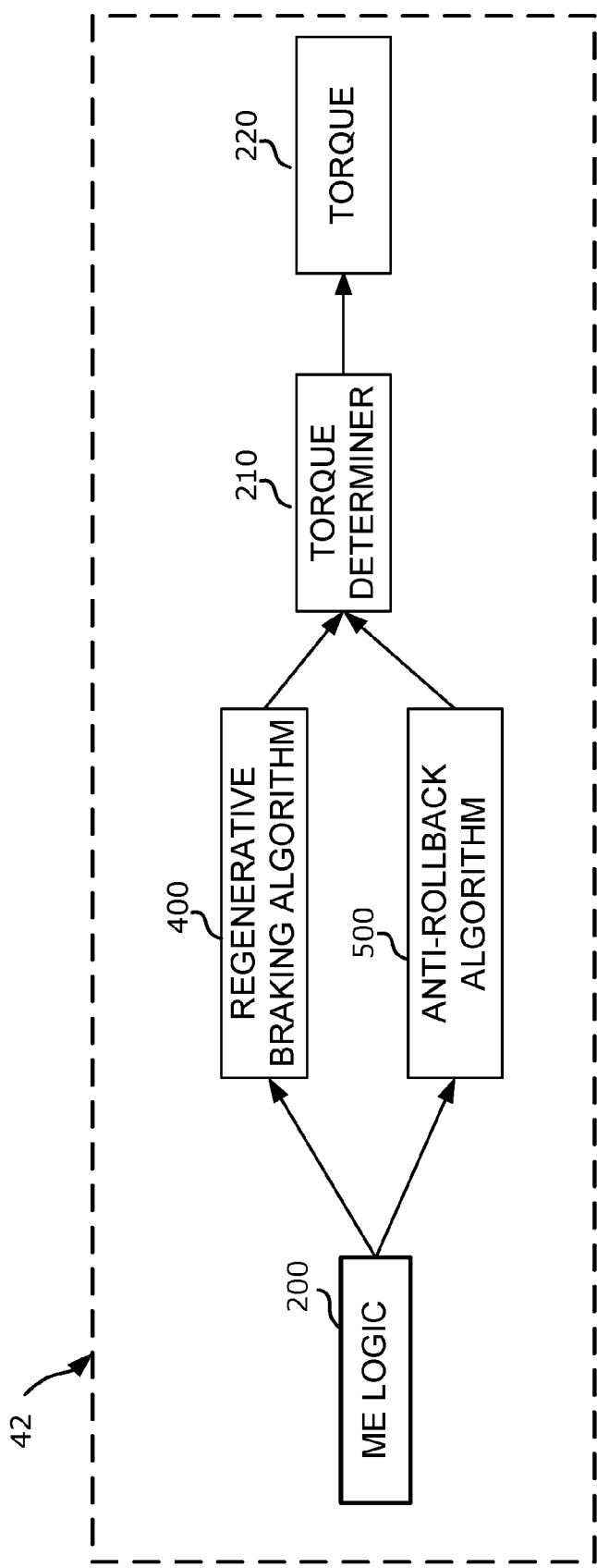
FIG. 4 is a block diagram of a control system to determine an applied motor torque.

Embodiments of a rollback control method will be described hereinbelow with reference to FIGS. 4-7. FIG. 4 is a block diagram of an embodiment of a control system to determine an applied motor torque, including a mass estimation system depicted in FIG. 5, a regenerative braking algorithm depicted in FIG. 6, and an anti-rollback braking algorithm depicted in FIG. 7. Many aspects of this disclosure are described in terms of sequences of actions to be performed by a controller or other hardware capable of executing programmed instructions. These elements can be embodied in the controller of the driveline system, such as a driveline control module or unit (DCM or DCU), or in a controller separate from, and communicating with an DCM/DCU. In an embodiment, the driveline controller and/or DCM/DCU can be part of a controller area network (CAN) in which the controller, sensor, actuators communicate via digital CAN messages. It will be recognized that in each of the embodiments, the various actions for implementing the control strategy could be performed by specialized circuits (e.g., discrete logic gates interconnected to perform a specialized function), by program instructions, such as program modules, being executed by one or more processors (e.g., a central processing unit (CPU) or microprocessor), or by a combination of both, all of which can be implemented in a hardware and/or non-transient computer readable instructions of the ECM/ECU and/or other controller or plural controllers. Logic of embodiments consistent with the disclosure can be implemented with any type of appropriate hardware and/or non-transient computer readable instructions, with portions residing in the form of computer readable storage medium with a control algorithm recorded thereon such as the executable logic and instructions disclosed herein, and can be programmed, for example, to include one or more singular or multidimensional lookup tables and/or calibration parameters Thus, the term "logic" as used herein includes software and/or firmware comprising processing instructions executing on one or more programmable processors, application-specific integrated circuits, field-programmable gate arrays, digital signal processors, hardwired logic, or combinations thereof, which may be referred to as "controllers". A non-transitory machine-readable medium comprising logic can additionally be considered to be embodied within any tangible form of a computer-readable carrier, such as solid-state memory, containing an appropriate set of computer instructions and data structures that would cause a processor to carry out the techniques described herein. The computer readable medium can comprise a random access memory (RAM), a read-only memory (ROM), an erasable programmable read-only memory (EPROM or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

In certain embodiments, driveline controller 40 forms a portion of a processing subsystem including one or more computing devices having memory, processing, and communication hardware. Driveline controller 40 and its functionality may be implemented in any known manner. For example, driveline controller 40 may be a single device or a distributed device, and the functions of the controller may be performed by hardware and/or as computer instructions on a non-transient computer readable storage medium.

In certain embodiments, driveline controller 40 includes one or more modules that functionally execute the operations of the controller. The description herein including modules emphasizes the structural independence of certain aspects of controller 40 and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Figure 6:
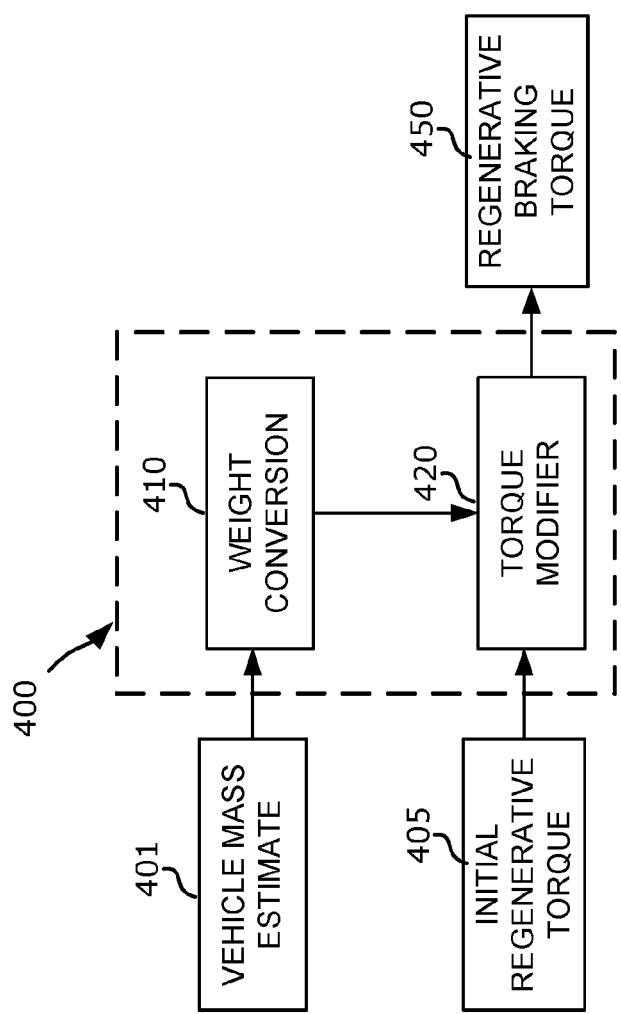
FIG. 6 is a block diagram of an embodiment of a regenerative braking algorithm of the control system of FIG. 4.

Referring to FIG. 4, a control system is provided to determine a motor torque 220 to be applied by vehicle 100. As shown, the control system is embodied in driveline logic 42. In an exemplary embodiment, the motor torque 220 is applied to counteract the motion of the vehicle either to prevent the vehicle from rolling backwards or forwards by providing anti-rollback torque 550 (FIG. 7), or to generate electricity from the vehicle's kinetic energy by providing regenerative braking torque 450 (FIG. 6). Sensors 44 may include speed, road grade sensor, wind speed, torque, pedal depression, motor load, vehicle direction, brake, acceleration, GPS, or any other sensor related to vehicle operation. Sensors may be Micro Electronic Mechanical Systems (MEMS) as is known in the art. Furthermore, sensors 44 may comprise a six axis inertial measurement unit (IMU).

Sensor outputs are communicated to mass estimation (ME) logic 200, described with reference to FIG. 5. A regenerative braking algorithm 400 and an anti-rollback algorithm 500, described with reference to FIGS. 6 and 7, receive an estimated vehicle mass from ME logic 200 and output signals to torque determiner 210, which generates a torque 220. Generally, the mass of the vehicle can be determined by monitoring power and acceleration over time, wherein power is related to the product of mass and acceleration. The mass of the vehicle can be characterized from measurement of various power levels and acceleration levels obtained when the vehicle is empty and on flat terrain. The ratio of power/acceleration when the vehicle is loaded compared to when it is empty will indicate the mass due to the load. If the power/acceleration ratio is tracked over time (thus averaging the effect of changing grade) with the vehicle loaded, the mass can be obtained and based on the mass the grade can be obtained as the vehicle travels.

Figure 5:
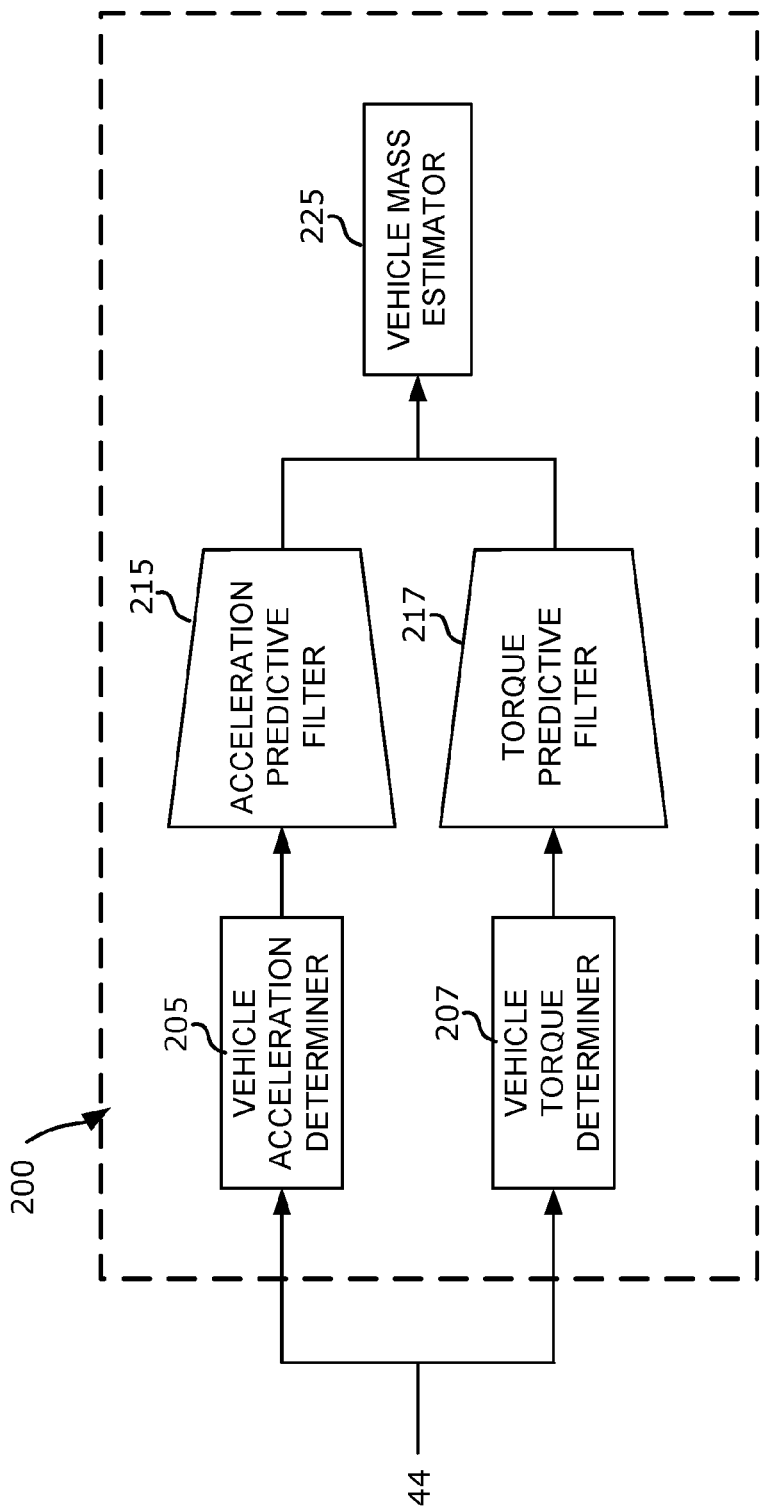
FIG. 5 is a block diagram of an embodiment of a mass estimation system of the control system of FIG. 4.

Referring now to FIG. 5, in the illustrated embodiment sensors include vehicle speed sensor 44A and a road grade sensor 44B. A vehicle acceleration determiner 205 comprises logic that utilizes the vehicle speed to determine acceleration of the vehicle. Vehicle acceleration determiner 205 can also receive an acceleration value from the engine control unit or other on-board systems. A vehicle torque determiner 207 comprises logic that utilizes the vehicle the road grade to determine a torque. Torque may be determined in any manner known in the art, inclusive from voltage commands received by the inverter, and then compensated by grade, to account for the additional load required to overcome gravity, such as during travel on an inclined road. In the illustrated embodiment, an acceleration predictive filter 215 and a torque predictive filter 217 are provided to stabilize the acceleration and torque signals, and the filtered outputs are provided to vehicle mass estimator 225. As shown, predictive filters 215 and 217 are Kalman filters. A Kalman filter, as is commonly known in the art, is a predictive filter which uses a series of measurements over time to produce an estimate of a variable that tends to be more accurate than the single instance of the measured variable alone. In ME logic 200, acceleration predictive filter 215 receives a vehicle acceleration from vehicle acceleration determiner 205 and produces an estimate of vehicle acceleration based on previous measurements of vehicle acceleration. Similarly, torque predictive filter 217 receives a vehicle torque from vehicle torque determiner 207 and produces an estimate of vehicle torque based on previous measurements of vehicle torque. In another embodiment, ME logic 200 may exclude predictive filters and use values directly from vehicle acceleration determiner 205 and vehicle torque determiner 207.

In the illustrated embodiment, a torque value is generated by vehicle torque determiner 207/predictive filter 217, which represents a force required to accelerate the vehicle to the acceleration value generated by vehicle acceleration determiner 205/predictive filter 215. The mass or weight of the vehicle can then be calculated based on force and acceleration values utilizing Newton's second law of motion as is known in the art. Vehicle mass estimator 225 generates the mass estimate applying Newton's second law with the given torque and acceleration parameters. In this disclosure mass and weight can be used interchangeably, and it should be understood that ME logic 200 can be utilized to estimate a vehicle's mass or its weight. In some embodiments, ME logic 200 may estimate the vehicle's weight based on a physics-based model of the vehicle, wherein the physics-based model of the vehicle may include at least aerodynamics, inertia, rolling resistance, and input torque values related to the vehicle. In an exemplary embodiment, ME logic 200 runs continuously throughout vehicle operation in order to actively provide vehicle mass estimates for use in determining motor torque 220. ME logic 200 may generate a vehicle mass estimate upon vehicle startup, when shifting into a different gear, or at set time intervals. The ability to generate vehicle mass estimates at different times will be particularly advantageous for vehicles carrying varying amounts of cargo.

Referring now to FIG. 6, a vehicle mass estimate 401 generated by ME logic 200 is provided to regenerative braking algorithm 400. Regenerative braking algorithm 400 converts the vehicle mass estimate 401 into a mass/weight factor through weight conversion 410. Weight conversion 410 converts the value of vehicle mass estimate, which typically has units of mass or weight, into a numeric weight factor. The numeric weight factor can also be a gain factor. In an exemplary embodiment, the weight factor is a rational number. Regenerative braking algorithm 400 also receives an initial regenerative torque 405. Initial regenerative torque 405 can be a predetermined torque value stored in the controller, or a torque value that is generated without considering vehicle mass estimate 225, for example from vehicle torque determiner 207/predictive filter 217. The regenerative braking algorithm 400, through torque modifier 420, modifies the initial regenerative torque 405 into a regenerative braking torque 450 to be sent to torque determiner 210 (FIG. 4) as discussed further herein. Torque modifier 420 may multiply the weight factor from weight conversion 410 by initial regenerative torque 405 to generate the regenerative braking torque 450. Accordingly, the regenerative braking torque 450 will be greater or less than the initial regenerative torque 405 based on the value of the weight factor. The weight factor can thus be used to increase regenerative braking as the weight of the vehicle increases relative to tare weight and conversely to decrease regenerative braking as the weight decreases from the maximum weight.

Figure 7:
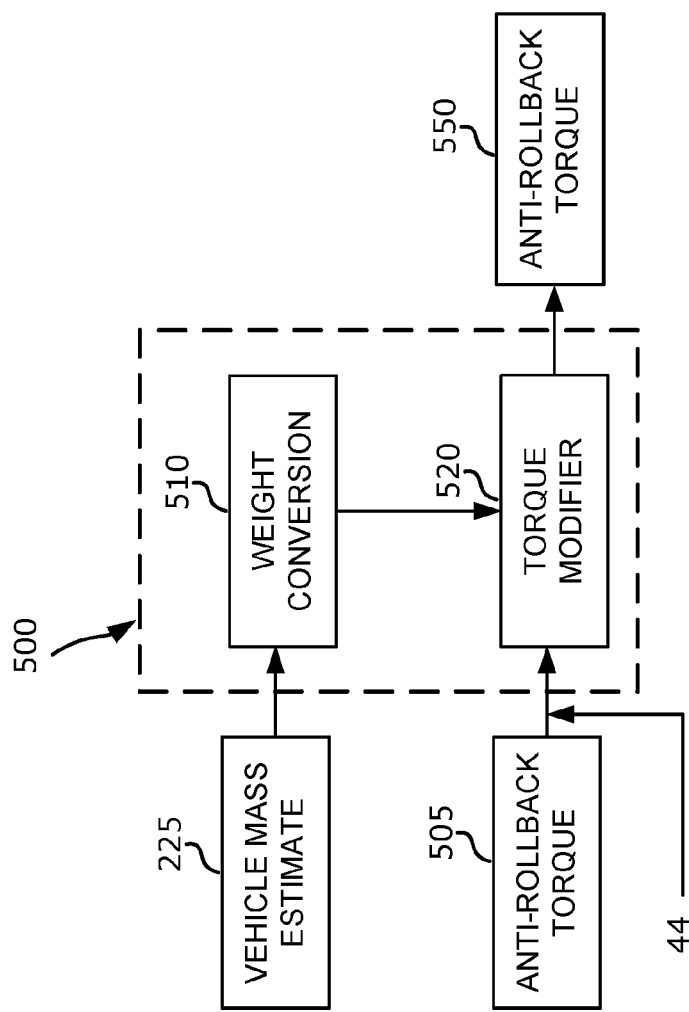
FIG. 7 is a block diagram of an embodiment of an anti-rollback braking algorithm of the control system of FIG. 4.

Referring to FIG. 7, anti-rollback algorithm 500 generates an anti-rollback torque 550 in a similar fashion to the regenerative braking torque 450. The anti-rollback algorithm 500 converts the vehicle mass estimate into a weight factor through weight conversion 510 in a similar manner to weight conversion 410, however weight conversion 510 may have different scaling parameters or a different method of conversion based on the appropriate amount of modification required based on changes in vehicle mass. For example, vehicle mass can be made to have a greater effect on regenerative braking than on anti-rollback, thus weight conversion 410 may convert the vehicle mass estimate into a weight factor of greater magnitude than weight conversion 510. Anti-rollback algorithm 500 also receives a road grade from a grade sensor, e.g., sensor 44A. The road grade, weight factor, and the initial anti-rollback torque are converted into an anti-rollback torque 550 through torque modifier 520. Initial anti-rollback torque can be a predetermined torque value stored in the controller or can be a torque value not based on vehicle mass estimate 225, e.g., generated by vehicle torque determiner 207/predictive filter 217. The road grade value can also be converted into a road grade factor, similar to the weight factor, that can be multiplied by the initial anti-rollback torque through torque modifier 520. In this manner torque modifier 520 uses weight and grade factors to modify the initial, or conventionally generated, torque command to generate the anti-rollback torque 550 command used by the vehicle to mitigate rollback.

Referring again to FIG. 4, once the anti-rollback torque 550 and regenerative braking torque 450 have been determined, their values are sent to torque determiner 210. Torque determiner 210 determines if the vehicle is in a regenerative braking state or an anti-rollback state. For example, if the vehicle is slowing to a stop or speeding up from a stop on an incline, torque determiner 210 could determine that the vehicle is in an anti-rollback state, and would send anti-rollback torque 550 to the motor to generate motor torque 220. If the vehicle is slowing to a stop on a relatively flat grade, or if the vehicle is coasting, then torque determiner 210 could determine that the vehicle is in a regenerative braking state, and would send regenerative braking torque 450 to the motor to generate motor torque 220. If the vehicle is in neither an anti-rollback or regenerative braking state, then torque determiner 210 would not indicate that a negative torque should be provided, and the vehicle can operate without anti-rollback torque 550 or regenerative braking torque 450.

The electric vehicle may also comprise an accelerator pedal and sensor communicatively coupled with the driveline controller and operable to determine with the accelerator sensor a desired amount of acceleration based on the pedal position. The desired amount of acceleration can be used to determine a desired amount of torque (positive or negative) in a "single pedal" function. Thus, when the pedal is depressed, positive acceleration and torque are desired, and when the pedal is released, negative acceleration and torque are desired, even if the brake pedal is not actuated. This gives the driver the ability to control the speed of the vehicle with a single pedal. Torque determiner 210 may use the pedal position and speed signals to determine the braking state. Additionally, torque determiner 210 may use a drive mode signal to determine the braking state, in conjunction with the speed signal. Thus, if the drive mode signal indicates forward motion is desired, e.g., drive mode, but the vehicle is moving backward, then anti-rollback torque is needed, while if the pedal position indicates braking is desired in the drive mode, regenerative braking is needed.

In some embodiments, the ME logic is not used. The vehicle may comprise an ME logic enable switch 44C, shown in FIG. 3, that an operator can actuate to engage/disengage the ME logic. The switch may also be engaged when a trailer is connected, so that when the trailer is disconnected from the driveline the ME logic is disabled, for example. The ME logic enable switch can thus cause the vehicle to operate regardless of changes in mass, using the initial torque values. The initial torque values can be predetermined to be low values, which while inefficient, may provide a safety limit.

Accordingly, the application of a motor torque 220 to a vehicle in order to achieve regenerative braking or anti-rollback can be accomplished with consideration of the weight/mass of the vehicle. Mass estimation is improved by the addition of predictive filters to the ME logic 200, which allows for increased accuracy in vehicle mass estimate 225 and accordingly improved ability to provide regenerative braking torque 450 or anti-rollback torque 550.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

As used herein, the transitional term "comprising", which is synonymous with "including." or "containing," is inclusive or open-ended and does not exclude additional, unspecified elements or method steps. By contrast, the transitional term "consisting" is a closed term which does not permit addition of unspecified terms.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

We claim:

1. A method of controlling torque of an electric vehicle, the method comprising:
   sensing a surface grade;
   determining an acceleration rate of the vehicle;
   determining an initial torque of the vehicle;
   estimating a weight of the vehicle based on the surface grade, the determined acceleration rate, and the initial torque;
   converting the weight of the vehicle to a weight factor;
   determining an output torque by applying the weight factor to the initial torque; and
   determining whether the vehicle is in a regenerative braking state or an anti-rollback state,
   wherein the weight factor is a regenerative weight factor in the regenerative braking state and an anti-rollback weight factor in the anti-rollback state.

2. The method of claim 1, wherein the regenerative weight factor and the anti-rollback weight factor are different.

3. The method of claim 1, further comprising receiving a mass-estimation logic disable signal, and responsive to the mass-estimation logic disable signal, setting the output torque to the initial torque.

4. The method of claim 1, further comprising receiving a mass-estimation logic disable signal, and responsive to the mass-estimation logic disable signal, setting the weight factor to 1.0.

5. The method of claim 1, further comprising filtering the acceleration and the initial torque before estimating the weight.

6. The method of claim 5, wherein filtering comprises applying Kalman filters to the acceleration and the initial torque.

7. The method of claim 1, further comprising sensing a speed of a vehicle, wherein determining the acceleration includes converting the speed to an acceleration value.

8. The method of claim 1, further comprising sensing a speed of a vehicle, wherein determining the acceleration includes converting the speed to an acceleration value.

9. The method of claim 8, wherein generating a vehicle weight estimation is further based on a physics-based model of the vehicle, the physics-based model comprising at least aerodynamics, inertia, rolling resistance, and input torque values related to the vehicle.

10. The method of claim 1, wherein the gain factor is a positive, real number.

11. The method of claim 1, wherein determining the output torque comprises multiplying the weight factor to the initial torque.

12. A driveline controller for an electric vehicle, comprising:
    weight estimation logic structured to implement a torque control method as in claim 1.

13. An electric vehicle comprising:
    a road grade sensor;
    a speed sensor;
    a motor-generator; and
    the driveline controller as in claim 12, the driveline controller operable to cause the motor-generator to generate the output torque.

14. The electric vehicle of claim 13, wherein the driveline controller further comprises a vehicle dynamics model, the vehicle dynamics model containing values associated with vehicle torque, direction, aerodynamics, inertia, rolling resistance, and frictional losses.

\* \* \* \* \*